United States Patent
Lombardi et al.

(10) Patent No.: US 6,342,541 B1
(45) Date of Patent: Jan. 29, 2002

(54) MACHINABLE POSITIVE IMAGE MODEL MATERIAL FOR SHAPE DEPOSITION MANUFACTURING

(75) Inventors: John Lang Lombardi; Gregory John Artz, both of Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 0 days.

(21) Appl. No.: 09/456,865

(22) Filed: Dec. 8, 1999

(51) Int. Cl.[7] ................................................ C08F 2/46
(52) U.S. Cl. ..................... 522/88; 522/116; 522/114; 522/120; 522/121; 522/71; 522/126; 527/314; 527/315; 525/242; 430/286.1; 430/287.1; 430/269; 430/280.1; 430/281.1; 264/401
(58) Field of Search .............................. 522/88, 89, 114, 522/116, 126, 71, 120, 121; 106/38.2; 430/269, 280.1, 281.1, 286.1, 287.1; 525/242; 527/312, 313, 314, 315; 264/401

(56) References Cited

U.S. PATENT DOCUMENTS

| 4,046,726 A |   | 9/1977 | Meiner et al. ............ 260/27 R |
| 4,374,670 A | * | 2/1983 | Slocombe .................... 106/20 |
| 4,485,131 A |   | 11/1984 | Adams et al. ............ 427/388.2 |
| 4,927,667 A |   | 5/1990 | Shih et al. .................. 427/184 |
| 4,942,001 A |   | 7/1990 | Murphy et al. ................ 264/22 |
| 5,207,371 A |   | 5/1993 | Prinz et al. .................. 228/125 |
| 5,286,573 A |   | 2/1994 | Prinz et al. .................. 428/457 |
| 5,301,415 A |   | 4/1994 | Prinz et al. .................... 29/458 |
| 5,301,863 A |   | 4/1994 | Prinz et al. .................... 228/33 |
| 5,381,735 A | * | 1/1995 | Fifield ........................ 101/483 |
| 5,501,942 A | * | 3/1996 | Salvin et al. ............. 430/280.1 |
| 5,604,282 A |   | 2/1997 | Grogan et al. .............. 524/232 |
| 5,719,221 A |   | 2/1998 | Swidler ....................... 524/309 |

* cited by examiner

Primary Examiner—James J. Seidleck
Assistant Examiner—Sanza McClendon
(74) Attorney, Agent, or Firm—Banner & Witcoff, Ltd.

(57) ABSTRACT

A manufacturing method comprising the steps of forming at first solidified wax layer of a desired shape, depositing onto the first solidified wax layer at least one layer of a liquid resin formulation, solidifying the layer of liquid resin formulation, depositing a second wax layer on to the combination of the first solidified wax layer and the layer of solidified resin formulation, solidifying the second wax layer, and separating the solidified resin formulation from first and second wax layers. Preferably, the resin formulation comprises at least one monofunctional water soluble vinyl or acrylic monomer in combination with a low molecular weight aliphatic polymer having acrylic or methacrylic acid functionality. The solidified wax and resin formulation layers can be machined as may be desired to form mold of a given shape comprising wax layers when the layer of formulation is separated from the wax layers.

3 Claims, 1 Drawing Sheet

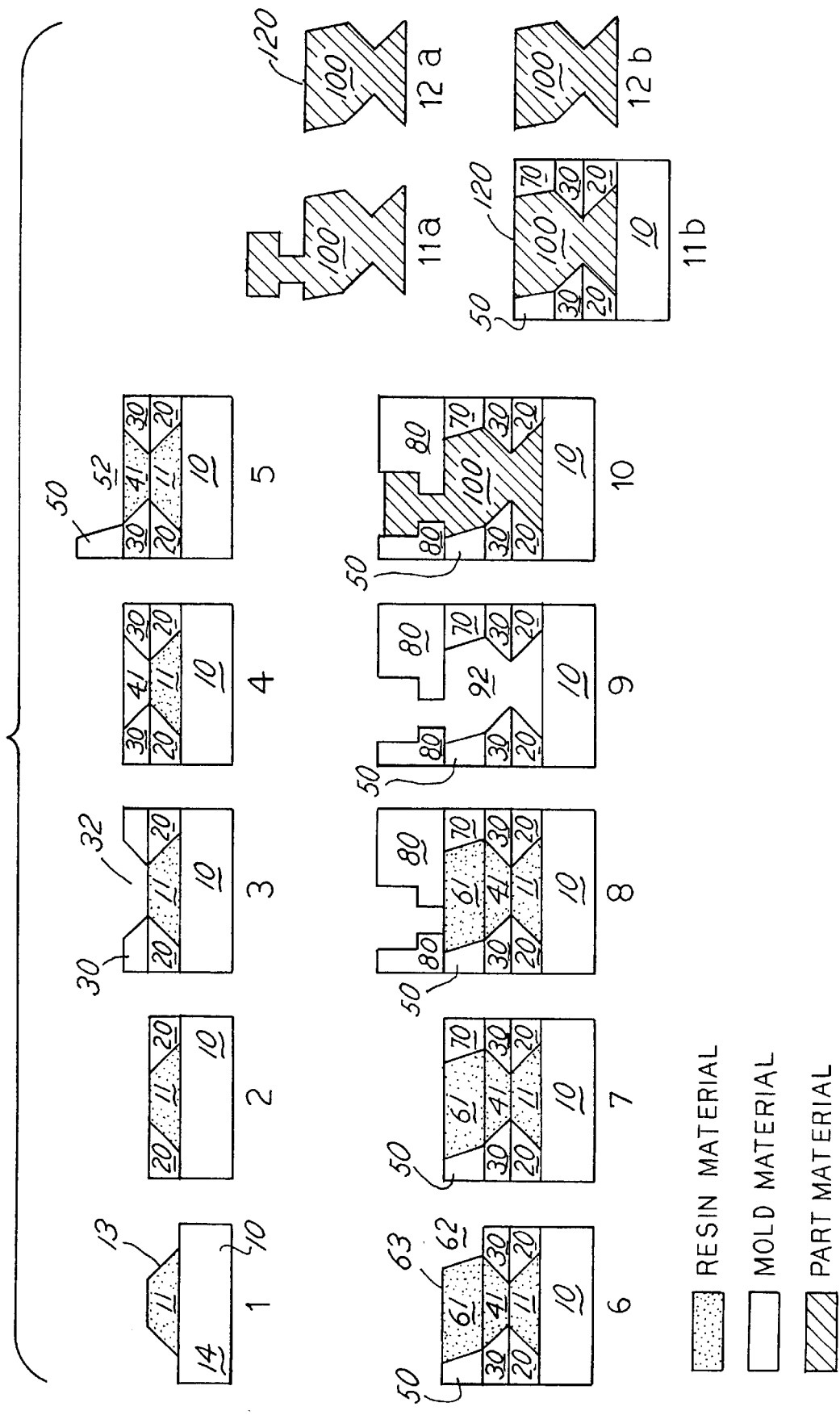

MACHINABLE POSITIVE IMAGE MODEL MATERIAL FOR SHAPE DEPOSITION MANUFACTURING

This invention was made with Government support under Office of Naval Research Contract No. N00014-98-1-0734-P00001, awarded by the Department of Defense. The Government may have certain rights in the invention.

FIELD OF THE INVENTION

This invention relates to shape deposition manufacturing of products having a complex configuration from using a liquid resin formulation that may be deposited in layers, polymerized (preferably photopolymerized) and precision machined.

BACKGROUND OF THE INVENTION

Shape Deposition Manufacturing (SDM) technology comprises fabrication of parts or products by the sequential deposition, solidification, and precision Computer Numeric Controlled (CNC) machining of wax layers which are deposited upon one another until a desired product mold results. See e.g., U.S. Pat. Nos. 5,207,371; 5,286,573; 5,301,415 and 5,301,863. A liquid resin (i.e., polyurethane, epoxy, or ceramic gelcasting slurry) is subsequently cast into the wax mold and cured to produce a desired polymer or green ceramic part or product having a complex shape.

Unfortunately, many parts or products have complex geometries (i.e., internal chambers or overhang features) that make it difficult to accurately fabricate wax molds in successive layers without causing slumpage and remelting of previously deposited and CNC machined wax layer features. In particular, the highly fluid nature of the molten wax coupled by its slow solidification rate often causes a newly deposited layer of wax to slump considerably prior to its solidification on an adjacent or previously deposited layer. This can detract from product dimensional accuracy of the wax mold and thus the product will have imperfections. The problem of casting or molding complex parts or products using a layer by layer wax technique to form the complex mold has perplexed those of skill in the art.

SUMMARY OF THE INVENTION

Briefly, in accordance with the present invention, one is able to prepare accurate parts or products by depositing and photocuring liquid resin layers within each solidified and machined wax layer prior to the deposition of a subsequent wax layer. In other words, parts are fabricated by the deposition, solidification, and machining of successive wax and cured resin layers until the final mold encapsulating a resin formulated part results. The wax and resin layer solidification is accomplished by cooling and UV photopolymerization (e.g., photocuring) respectively. By following the described steps, a completed wax mold results with an internal core or cavity filled with a photocured resin product. The photocured resin product has the dimensions of the final desired molded part or product. Thus, the resin core may be washed from the mold by immersion in a neutral or weakly alkaline aqueous solution (preferably a solution having a pH of greater than about 8).

The resin which is preferred for use in the process is composed of at least one monofunctional water soluble vinyl or acrylic monomer (e.g., N-Vinyl pyrrolidone or N,N'-Dimethylacrylamide) combined with a low molecular weight aliphatic polymer having acrylic acid (AA) or methacrylic acid (MA) functionality. A major advantage of the cured resin of the present invention is that it has dimensional stability even after exposure to high ambient humidity, yet readily dissolves in aqueous solutions. This provides an attractive means for fabricating fugitive parts or products, support materials, or soluble cores for wax molds constructed using Shape Deposition Manufacturing technology.

An object of the present invention is to provide formulations that have the ability to photocure as very thick layers, e.g. a 3 millimeter resin layer, as opposed to thin wax layers (e.g., 100 micronmeter wax layers typically encountered in accordance with conventional Shape Deposition Manufacturing technology) over a 2 minute period in a single pass using ultraviolet (UV) radiation.

Another object of the present invention is to provide techniques and formulations that enable casting or molding parts and products that have smooth surfaces and with minimal chipping.

A further objection of the present invention is to provide techniques and formulations that provide the ability to fabricate positive image structures.

Another object of the present invention is to provide techniques and formulations that have the ability to fill fine crevices and machine features in a wax mold as it is being manufactured.

A further object of the present invention is to provide techniques and formulations that result in higher strength molds than conventional Shape Deposition Manufacturing technology.

Yet another object of the present invention is to provide techniques and formulations that enable manufacture of a completely soluble, organic molded product with no mineral filler.

Additional objects of the present invention include the provision of techniques and formulations for making molds that incorporate the use of sucrose, which reduces shrinkage and reduces exotherm (i.e., energy) on curing, resulting in less bubbling and smoother surfaces in the part and/or mold. Notably, the refractive index of sucrose is similar to the resin monomers of the present invention. Further, it has been discovered that sucrose has minimal effect upon UV transmission and resin curing.

BRIEF DESCRIPTION OF THE DRAWINGS

In the detailed description which follows, reference will be made to the drawing comprised of a single FIGURE which stepwise illustrates the method of the present invention.

DETAILED DESCRIPTION OF THE PREFERRED EMBODIMENTS

In FIG. 1, each step of a preferred embodiment of the manufacturing method of the present invention is illustrated. In Step 1, a resin layer 11 is deposited onto a first mold or base layer 10, which is made of mold material 14. In a preferred embodiment, the mold material 14 is a wax. Prior to deposit of the resin layer 11, the mold layer 10 can be formed by depositing liquid wax into a layer border (not shown), and then solidifying the wax by cooling the wax. Mold layer can be machined if desired to any suitable shape. Prior to curing resin layer 11, the resin layer 11 can be maintained on top of first mold layer 10 in any suitable manner. For example, a layer border (not shown) can be used to maintain the resin layer 11 on top of first mold layer 10, and then removed after the resin layer 11 is cured. In a preferred embodiment, the resin layer 11 is hardened by photocuring. Preferably, photocuring is accomplished by subjecting the resin layer 11 to UV radiation. Further, in a preferred embodiment, the UV radiation causes the resin material to photopolymerize, thereby hardening the resin material. Other mold layers and resin layers can also be maintained after deposition and prior to hardening using layer borders (not shown). The solidified mold layers and the cured resin layers can be machined as may be desired. As shown in FIG. 1, after curing, the resin layer 11 can be machined to any desired shape in Step 1, in this case a polygon 13.

In Step 2, a second mold layer 20 is then deposited so that is surrounds the sides of polygon 13. Second mold layer 20 is made of wax mold material 14 just as the first mold or base layer 10. Second mold layer 20 is then hardened by cooling.

In Step 3, a third mold layer 30 is then deposited onto second mold layer 20 and polygon 13. Mold layer 30, which is also be made of wax mold material 14, can then be hardened by cooling and machined to define any desired space 32 in Step 3, in this case a mirror image of polygon 13.

In Step 4, a second resin layer 41 is deposited into the space 32 and is subsequently photocured.

In Step 5, a fourth mold layer 50 deposited onto the third mold layer 30 and the second resin layer 41. Fourth mold layer 50, which is also made of wax mold material 14, can be hardened by cooling and machined to define any desired shape 52 in Step 5. In this example, mold layer 50 is machined in a manner so that in combination with resin layer 41 and mold layer 30, space 52 is defined thereby.

In Step 6, a third resin layer 61 is deposited into space 52 and onto the second resin layer 41, mold layer 50 and mold layer 30, and after curing, third resin layer 61 is machined as desired. In this example, resin layer 61 defines a parallelogram 63. Parallelogram 63 and mold layer 30 define space 62.

In Step 7, a fifth mold layer 70 is deposited to the space 62 previously filled by third resin layer 61 prior to being removed away (by machining) in Step 6. Mold layer 70 is made of mold material 14 just as the prior mold layers 10, 20, 30, and 50, and hardened by cooling.

In Step 8, a sixth mold layer 80 is deposited onto fifth mold layer 70 and third resin layer 61, and after hardening by cooling, mold layer 80 is then machined as desired. Mold layer 80 is made of mold material 14 just as the prior mold layers.

In Step 9, the first resin layer 11, the second resin layer 41, and the third resin layer 61, which in combination define a mold cavity or product shape, can be dissolved using a suitable solvent. A suitable solvent may include, but is not limited to, water, aqueous alkaline and/or detergent solutions. Preferably, the solvent has a pH of greater than about 8. Mold layers 10, 20, 30, 50, 70 and 80 then define a space or mold cavity 92.

In Step 10, a suitable part material 100 is then deposited into the space 92 previously filled with the resin layers 11, 41, and 61. Part material 100 is then allowed to harden or cure.

As shown in FIG. 1, in Step 11a, mold layers 10, 20, 30, 50, 70 and 80 are removed from part material 100 using a suitable method, such as dissolving away the mold layers with a suitable solvent and/or detergent and/or vaporizing/pyrolyzing the wax mold layers using heat. In Step 12a, the part material 100 can be further machined to a desired shape 120.

Alternatively, as shown in FIG. 1, in Step 11b, mold layer 80 is machined away from part material 100 and part material 100 can be machined to a desired shape 120. In Step 12b, mold layers 10, 20, 30, 50 and 70 are removed from shape 120 using a suitable method, such as dissolving away the mold layers with a suitable solvent and/or detergent and/or burning off the mold layers using heat. Shape 120 is the same resulting shape in accordance with following the method shown in Steps 11b and 12b with the method shown in Steps 11a and 12a.

A wide variety of shapes that can be made in accordance with the present invention. In accordance with the present invention, much thicker layers can be used than in conventional manufacturing techniques, and the time to make a product with a given shape using the present invention is much shorter than attainable using conventional manufacturing techniques wherein only wax layers are used. For example, the present invention can cure a 3 millimeter thick resin layer over a two minute period in a single pass using UV radiation, whereas conventional techniques can only cure a 100 micronmeter wax layer in a single pass using UV radiation over the same period time. Because the resin acts as a support, thicker layers may be employed in the described process.

As previously noted, the preferred resin formulations of the present invention comprise at least one monofunctional water soluble vinyl or acrylic monomer (e.g., N-Vinyl pyrrolidone or N,N'-Dimethylacrylamide) combined with a low molecular weight aliphatic polymer having acrylic acid (AA) or methacrylic acid (MA) functionality. The AA or MA functionality may be either incorporated into the main chain backbone or as pendant groups. The AA or MA functionality can be any suitable polymer, for example, polyethylene co-acrylic acid, polystyrene co-acrylic acid, or polyalkylacrylate co-acrylic acid. The acid groups present in the AA or MA derived polymer have been shown to strongly hydrogen bond to the polar carbonyl groups present in the monofunctional water soluble monomers. These hydrogen bonds are sufficiently strong that they render the monofunctional monomer as well as its UV photocured polymer product to be insoluble in water. See E. M. Pearce, S. P. Ting, & T. K. Kwei J. Polym. Sci. Polym. Letters Ed. 18 201 (1980); and K.R. Shah, Polymer 28 1212–6 (1987).

Addition of a weakly alkaline aqueous solution to the photocured resin neutralizes the acid groups and disrupts the interchain hydrogen bonded complexes which enable the polymers to become dissolved in water. Suitable bases which yield water sufficiently alkaline include dilute ammonium hydroxide and its carbonate salts, as well as alkali/alkaline earth hydroxides. Other suitable bases may be employed. Furthermore, this interchain association is sufficiently strong that the resulting polymer complex has a heat distortion temperature above that of either individual polymer. See E. M. Pearce, S. P. Ting, & T. K. Kwei, J. Polym. Sci. Polym. Letters Ed. 18 201 (1980). The enhanced interchain interaction arising from complexation may enhance the strength and toughness of the polymer materials as reflected by its facile CNC machinability and resistance to chipping.

Some U.S. patents describe compositions between linear water soluble polymers and polymers having carboxylic acid functionality, whereby the acid complex is touted as being water insoluble yet readily dissolved in alkaline solution. These materials are claimed to be useful as strippable coatings for floors, automobiles, and other protective coatings. Examples of alkali strippable coatings include: J. S. Shih, U.S. Pat. No. 4,927,667, (1990); G. W. Grogan, U.S. Pat. No. 5,604,282 (1997); R. D. Meiner, U.S. Pat. No. 4,046,726 (1977); R. Swindler, U.S. Pat. No. 5,719,221 (1998); R. G. Adams, U.S. Pat. No. 4,485,131 (1984). However, none of these patents teach or suggest the use of linear water soluble polymers and polymers having carboxylic acid functionality for use in shape deposition manufacturing as described herein.

Other components may be incorporated into the resin formulation of the present invention to enhance its properties. In particular, a sugar, such as a confectioner's powdered sugar, is added as a soluble filler. In addition, a surfactant is added to enhance the resin wetting upon the wax surface. A variety of commercial substituted acetophenone or benzophenone UV photoinitiators, as well as substituted amine or phosphine oxide synergists, can also be added to impart rapid photocuring properties to the resin.

Examples of useable resin compositions in accordance with the preferred embodiments of the present invention are listed in tabular form below (Tables I through V). All of these materials can be readily cured using UV light obtained from either natural or mercury vapor lamps. An example of a mercury vapor lamp is a 200 W, 200–400 nm lamp manufactured by UVEXS Inc., Sunnyvale, Calif.

In Examples I through V, the liquid ingredients were initially mixed together at room temperature followed by heating to 80–90° C., upon which the polyethylene-co-acrylic acid was then added. The polyethylene co-acrylic acid is a waxy solid and is added as prills to the heated monomers while stirring. The mixture was then stirred for about 5–10 minutes to uniformly disperse the polymer in the liquid. The suspension was subsequently cooled to room temperature prior to use. Example V includes the additional step of mixing sucrose last into the suspension at room temperature.

The benefits of the present invention using the resins described herein include:

(a) the ability to photocure very thick resin layers, e.g. a 3 millimeter layer, as opposed to 100 micronmeter wax layers over a 2 minute period in a single pass using UV radiation;

(b) the ability to machine the resin material easily and effectively for smooth surfaces with minimal chipping;

(c) the ability to fabricate positive image structures;

(d) due to the low viscosity of the resin material, the ability to fill fine crevices and machine features in the wax mold as it is being fabricated;

(e) higher strength molds; and (f) no mineral filler—thereby providing a completely soluble, organic system.

The additional benefits of using a sugar as a filler, i.e. sucrose, in the present invention include:

(a) lower shrinkage on curing;

(b) lower exotherm on curing, and thus less bubbling;

(c) a refractive index match between sucrose and resin monomers;

(d) minimal effect upon UV transmission/resin curing; and (e) sugar is typically a lower cost material than resin.

Sucrose refractive index=1.5376 (source: Handbook of Chemistry & Physics, 66th Edition (1985–86) CRC Press, Boca Raton, Fla.); N-vinylpyrrolidone refractive index= 1.5120.

EXAMPLE 1

| Component | Function | Concentration (wt. %) |
|---|---|---|
| N-Vinyl Pyrrolidone | Monomer | 74.0 |
| Surfadone LP-300* 1-Dodecyl-2-Pyrrolidone | Surfactant | 1.0 |
| Polyethylene-co-acrylic acid** | Toughening agent/ complexing agent | 6.0 |
| N,N'-dimethylacrylamide | Monomer | 10.0 |
| Ethyl-4-(dimethyl-amino)-benzoate | Photocure synergist | 2.0 |
| Irgacure 1700*** | Photoinitiator | 5.0 |
| N-methyldiethanolamine | Photocure synergist | 2.0 |

*Trademark of ISP, Inc., Wayne, NJ
**A-C 5120 Copolymer exhibiting 92 degrees C. melting point & 120 Acid Number, from Allied Signal Advanced Materials, Morristown, NJ
***mixture containing bis(2,6-Dimethoxybenzoyl)(2,4,4-trimethylpentyl) phosphine oxide & 2-Hydroxy-2-methyl-1-phenyl-1-propanone obtained from Ciba Specialty Chemicals Corp., White Plains, NY

EXAMPLE II

| Component | Function | Concentration (wt. %) |
|---|---|---|
| N-Vinyl Pyrrolidone | Monomer | 63.6 |
| N,N'-dimethylacrylamide | Monomer | 22.0 |
| Ethyl-4-(dimethyl-amino)-benzoate | Photoinitiator synergist | 3.0 |
| N-methyldiethanolamine | Photoinitiator synergist | 3.0 |
| 2,2-Dimethoxy-2-Phenyl acetophenone | Photoinitiator | 5.0 |
| Polystyrene-coacrylic acid Joncryl 690* | Toughening agent/ complexing agent | 3.4 |

Ccopolymer exhibiting 16,500 MW, & 240 Acid Number (NV), from S,C. Johnson Polymer Sturtevant, WI

EXAMPLE III

| Component | Function | Concentration (wt. %) |
|---|---|---|
| N-Vinyl Pyrrolidone | Monomer | 76.0 |
| Surfadone LP-300* 1-Dodecyl-2-Pyrrolidone | Surfactant | 1.0 |
| Polyethylene-co-acrylic acid** | Toughening Agent/ complexing agent | 6.0 |
| N,N'-dimethylacrylamide | Monomer | 12.0 |
| Irgacure 1700*** | Photoinitiator | 5.0 |

*Trademark of ISP, Inc., Wayne, NJ
**A-C 5120 Copolymer exhibiting 92 degrees C. melting point & 120 Acid Number, from Allied Signal Advanced Materials, Morristown, NJ
***mixture containing bis(2,6-Dimethoxybenzoyl)(2,4,4-trimethylpentyl) phosphine oxide & 2-Hydroxy-2-methyl-1-phenyl-1-propanone obtained from Ciba Specialty Chemicals Corp., White Plains, NY

EXAMPLE IV

| Component | Function | Concentration (wt. %) |
|---|---|---|
| N-Vinyl Pyrrolidone | Monomer | 68.1 |
| N,N'-dimethylacrylamide | Monomer | 20.0 |
| Irgacure 1700 | Photoinitiator | 6.0 |
| Carboset 526* Polyalkylacrylate-co-acrylic acid | Toughening Agent/ complexing agent | 6.9 |

*B.F. Goodrich Chemical Corp. (Cleveland, OH)

EXAMPLE V

| Component | Function | Manufacturer | Concentration (wt. %) |
|---|---|---|---|
| Polyethylene-co-acrylic acid** | Toughening Agent | Allied Signal Specialty Materials, Morristown, NJ | 1.50 |
| Surfadone LP-300* Surfactant | Surfactant | International Specialty Products, Wayne, NJ | 1.00 |
| N-Vinyl Pyrrolidone Monomer - A.C.S. Reagent Grade (stabilized with NaOH) | Monomer | International Specialty Products, Wayne, NJ | 48.50 |
| N,N'-Dimethylacrylamide Monomer A.C.S. Reagent Grade | Monomer | Aldrich Chemical Company, Milwaukee, WI | 3.75 |
| Confectioner's Powdered Sugar (Sucrose) | Soluble filler | Safeway Corp., Pleasanton, CA | 45.00 |
| Irgacure 1700 Photoinitiator*** | Photo-initiator | Ciba Specialty Chemicals, Tarrytown, N.Y. | 0.25 |

*Trademark of ISP, Inc., Wayne, NJ
**A-C 5120 Copolymer exhibiting 92 degrees C. melting point & 120 Acid Number, from Allied Signal Advanced Materials, Morristown, NJ
***mixture containing bis(2,6-Dimethoxybenzoyl)(2,4,4-trimethylpentyl) phosphine oxide & 2-Hydroxy-2-methyl-1-phenyl-1-propanone obtained from Ciba Specialty Chemicals Corp., White Plains, NY The preferred composition ranges of the present invention are as follows.

| COMPOSITION RANGES | % by Weight |
|---|---|
| Water Soluble Monofunctional Monomers | |
| N-Vinyl Pyrrolidone | 50–80 |
| N,N'-Dimethylacrylamide | 0–50 |
| Surfactant | |
| 1-Dodecyl-2-Pyrrolidone (Surfadone LP-300) | 1–10 |
| Toughening/Complexing Agent | |
| Polyethylene-co-acrylic acid | 1–8 |
| Polystyrene-co-acrylic acid | 1–15 |
| Polyalkylacrylate-co-acrylic acid | 1–15 |
| Photoinitiator | |
| Irgacure 1700 | 1–8 |
| 2,2-Dimethoxy-2-Phenyl acetophenone | 1–8 |
| Photocure Synergist | |
| Ethyl-4-(dimethylamino)-benzoate | 0–8 |
| N-methyldiethanolamine | 0–8 |
| Soluble Filler | |
| Confectioner's Powdered Sugar - Sucrose | 0–55 |

The present invention has been described in detail with particular reference to certain preferred embodiments thereof, and those of skill in the art will appreciate that variations and modifications are within the spirit and scope of the present invention as set forth in the following claims.

What is claimed is:

1. A liquid resin formulation comprising at least one monofunctional water soluble vinyl or acrylic monomer in combination with a low molecular weight aliphatic polymer having acrylic or methacrylic acid functionality, and further comprising a sugar.

2. The liquid resin formulation of claim 1 wherein the sugar comprises confectioner's powdered sugar.

3. A liquid resin formulation comprising at least one monofunctional water soluble vinyl or acrylic monomer in combination with a low molecular weight aliphatic polymer having acrylic or methacrylic acid functionality, wherein the low molecular weight aliphatic polymer having acrylic or methacrylic acid functionality comprises polyethylene co-acrylic acid, polystyrene co-acrylic acid, or polyalkylacrylate co-acrylic acid.

* * * * *